Aug. 14, 1945.  A. F. SCHWENDNER  2,382,507
MARINE TURBINE ELECTRIC DRIVE
Filed Dec. 30, 1942  2 Sheets-Sheet 1

WITNESSES:

INVENTOR
ANTHONY F. SCHWENDNER
BY
ATTORNEY

Patented Aug. 14, 1945

2,382,507

UNITED STATES PATENT OFFICE 2,382,507

MARINE TURBINE ELECTRIC DRIVE

Anthony F. Schwendner, Ridley Park, Pa., assignor to Westinghouse Electric Corporation, East Pittsburgh, Pa., a corporation of Pennsylvania Application December 30, 1942, Serial No. 470,555

12 Claims. (Cl. 137—158)

The invention relates to a ship propulsion arrangement of the electric drive type, wherein the propulsion speed is customarily varied by having the manually-operable control device or element arranged to effect speed changer adjustment of a governor to cause the latter to operate to move the admission valve, and it has for an object to provide apparatus of this character wherein the turbine driving the generator has its speed controlled over an adequate range and means is provided for limiting the steam flow to the turbine at each speed setting to avoid interruption of the synchronously connected relation of the generator and propulsion motor.

A further object of the invention is to provide a hydraulic speed change and motive fluid flow limit arrangement in connection with the turbine for propelling a ship through the instrumentality of an electric drive and wherein said arrangement is of such a character that it may be located at any suitable place on the ship.

Another object of the invention is to provide apparatus of the above character wherein the turbine speed is controlled by speed changer adjustment of a speed-compensated type governor and means is employed for limiting the steam flow at each speed so as to avoid disturbance of the synchronously connected relation of the generator and motor.

A further object of the invention is to provide for control of the propulsion speed of a marine electric drive installation by speed changer adjustment of a governor and by limiting the extent to which the admission valve may be opened by the governor at any speed and for adjustment of the limiting means independently of the governor so as to avoid load variation incident to travel in a rough sea from causing undesired variation in operation of the boiler and particularly of the combustion apparatus for supplying heat to the latter.

These and other objects are effected by the invention as will be apparent from the following description and claims taken in accordance with the accompanying drawings, forming a part of this application, in which:

Figure 1:
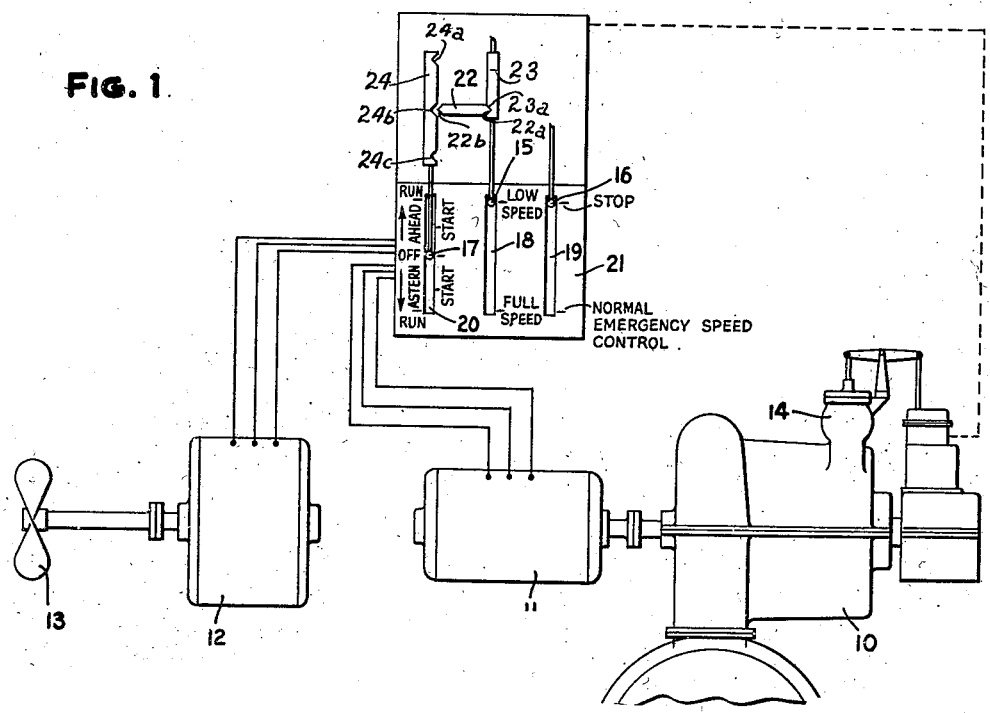
Fig. 1 is a diagrammatic view of a marine propulsion arrangement having the invention applied thereto.

In the drawings, the turbine 10 drives a generator 11 connected electrically to a motor 12 for operating the propeller 13.

The motor is preferably of the type which may be started and accelerated as an induction motor and then be synchronously connected for normal operation.

The admission valve 14 of the turbine is controlled so that the turbine torque is limited sufficiently to avoid interruption of the synchronously-connected relation of the generator and the motor. In other words, a rate of increase of turbine torque which is greater than that which can be utilized by the motor is avoided.

As shown in Fig. 1, the control mechanism for the turbine includes a speed control lever 15 and an emergency control lever 16 and the electrical apparatus has a control lever 17.

Figure 2:
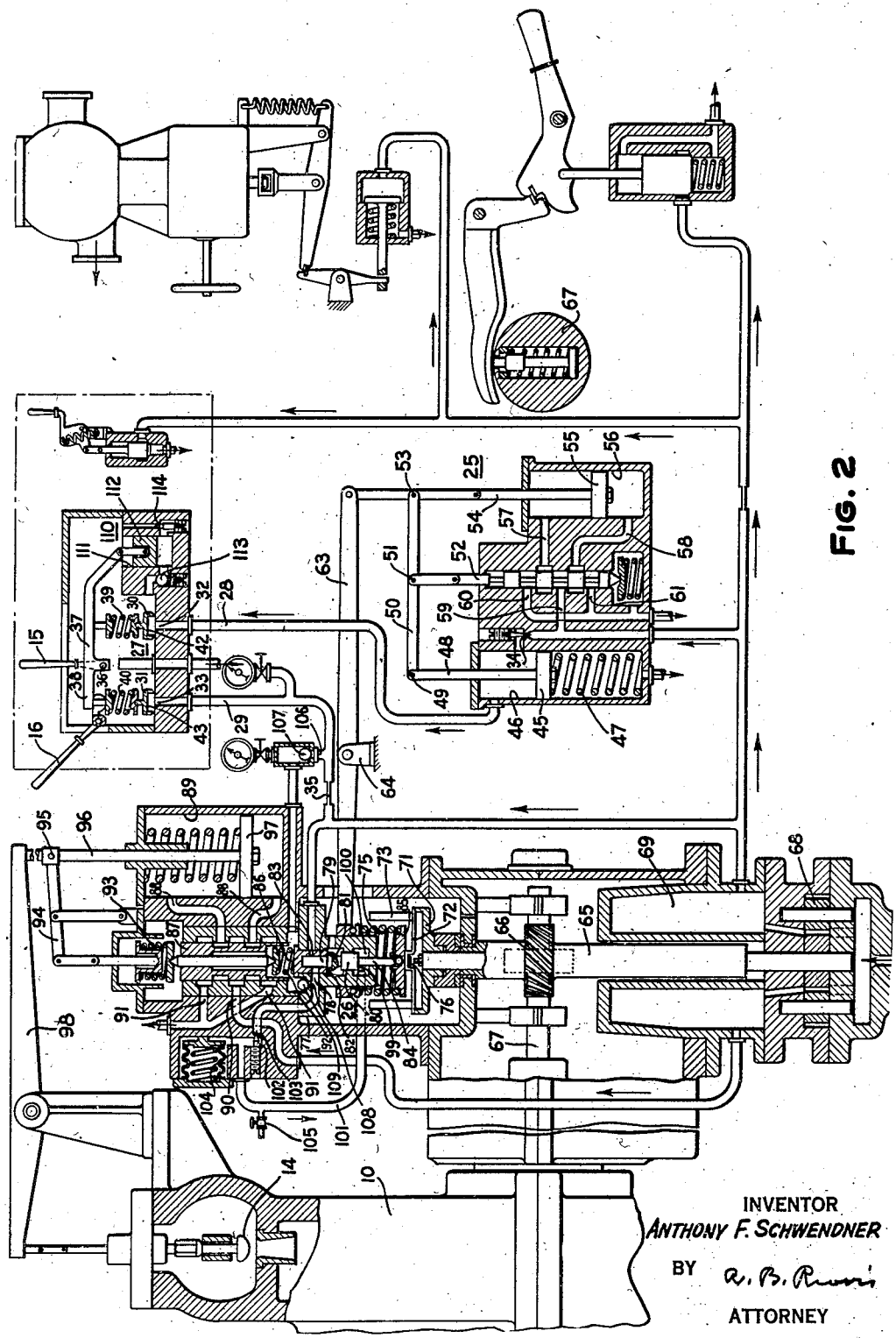
Fig. 2 is a sectional and diagrammatic view of the control arrangement.

The levers 15, 16, and 17 are shown as arranged in adjacent slots 18, 19, and 20, respectively, of a suitable structure 21. The low-speed position for a speed-control lever 15 is indicated as being at the top in Fig. 1 or at the extreme left in Fig. 2. The electrical apparatus control lever 17 is movable from an intermediate or "off" position in opposite directions for starting and running ahead and astern. With the speed-control lever 15 in low-speed position, the propulsion motor 12 is connected and started as an induction motor and then it is operated synchronously. Thereafter the speed-control lever 15 is moved downwardly in Fig. 1, or in a clockwise direction in Fig. 2, to increase the speed in either the ahead or astern direction.

Any suitable interlock, at 22, is associated with the speed-control lever 15 and the electrical apparatus lever 17 to assure that the latter lever is in running or synchronous position before the speed-control lever 15 is moved from the low-speed position to increase the speed and that the latter lever must be restored to low-speed position before the electrical apparatus lever can be shifted from either the ahead or astern running position. By way of example, there is shown a conventional type of mechanical interlock comprised by parallel rods 23 and 24 movable with the levers 15 and 17 and having convergent notches 23a, 24a, 24b, and 24c cooperating with the convergent ends 22a and 22b of the latch pin 22 movable transversely of the rods due to the camming action of notch faces on convergent end faces of the pin. As the end 22a may enter the notch 23a only when the lever 15 is in low-speed position, it will be apparent that the latter must be in low-speed position to permit of movement of the lever 17 and the rod 24 and that the latter lever must be in either of the running positions or the "off" position to register one of the notches 24a, 24b or 24c with end 22b to provide for movement of the lever 15 to increase the speed.

With the turbine 10 operating at low speed and driving the propeller 13 through the synchronously-connected generator and motor, the propulsion speed is increased by movement of the lever 15 away from its low-speed position and the speed is reduced by return movement of such lever, motion of the lever being utilized by a servo-motor, at 25, to alter the speed setting of the governor, at 26, which controls the admission valve 14.

The speed-control lever 15 is the actuating element of speed-control mechanism, at 27, used to control the servo-motor, at 25, and to impose a limit to the extent to which the admission valve 14 may be opened for each speed setting, that is, with movement of the lever in a direction to increase the speed, means is also operated thereby so as to be in suitable relation to the speed setting to avoid an increase in turbine speed at a rate greater than can be utilized by the motor.

As shown, the speed control mechanism is used to control liquid pressure in the spaces 28 and 29 by means of cup calves 30 and 31 in covering relation with respect to discharge ports 32 and 33 of the respective spaces, liquid being supplied to the pressure spaces 28 and 29 through suitable orifices 34 and 35 from any suitable source. The speed setting is varied by varying the pressure in the space 28; and, at the same time, the pressure in the space 29 is varied in inverse relation so as to provide a pressure suitable to the speed adjustment and which limits the turbine torque to avoid motor pullout.

The speed-control lever 15 is pivotally supported at 36 and it is connected to oppositely-extending arms 37 and 38 engaging the outer ends of the load springs 39 and 40, respectively. The inner ends of the local springs engage the cup valves 30 and 31 to apply forces to the latter in a closing direction and which are opposed to fluid pressure forces applied to the pressure areas 42 and 43 of the cup valves and subject to liquid pressure in the spaces 28 and 29. As the pressures in the spaces 28 and 29 are, therefore, fixed by the force exerted on the cup valves by means of the load springs 39 and 40, if the speed-control lever 15 is moved to the right in Fig. 2, the force of the spring 39 will be increased to increase the pressure in the space 28 and the force of the spring 40 will be reduced to reduce the torque-limiting pressure in the space 29.

The servo-motor, at 25, includes a piston 45 arranged in the cylinder 46, the latter being in communication with the pressure space 28 so that the force of such pressure acting on the piston is opposed by that of the spring 47, the piston moving downwardly upon increase in pressure and vice versa. The pressure-responsive piston has a stem 48 pivotally connected at 49 to one end of the lever 50, which is pivotally connected, at an intermediate point 51, to the relay 52 and is pivotally connected, at its other end, at 53, to the stem or rod construction 54 of the operating piston 55 arranged in the cylinder 56. The cylinder has ports 57 and 58 whose communication with the pressure port 59 and the exhaust ports 60 and 61 is controlled by the relay 52.

From the structure described, it will be apparent that the governor constitutes a part of the servo mechanism interposed between the manually-operable control device and the admission valve, the speed changer of the governor being adjusted by operation of the control device, and the governor, in consequence, moving the admission valve. Accordingly, when the lever 15 is moved by the operator to increase the pressure in space 28, the piston 45 and the relay 52 will move downwardly and fluid under pressure will in consequence be admitted below the piston 55 and exhausted from the space thereabove so as to cause the piston 55 to move upwardly, such upward movement restoring the relay to neutral cut-off position and resulting in the lever 63 being rocked counterclockwise about the fulcrum 64 to effect speed changing adjustment of the governor, at 26, to open the admission valve 14 wider to increase the speed.

The governor, at 26, preferably is of the pressure-transformer type such as disclosed and claimed in the patent to Gottlieb, No. 2,239,602, granted April 22, 1941. Briefly, the governor includes a vertical drive shaft 65 connected by gearing 66 to the turbine spindle 67, the lower end of the drive shaft operating a pump 68 for maintaining oil under pressure in the space 69 and the upper end carrying a rotatable structure 71 to which is diametrally attached a leaf or strap spring 72 carrying the flyweights 73. A load spring 75 opposes the thrust due to centrifugal force of the flyweights and it is engaged by the lever 63 so that the force thereof may be varied.

The leaf spring has a central thrust-transmitting portion 76 operatively connected to a pressure transformer so that changes in governing force may be transformed into fluid pressure changes. The pressure transformer includes a housing or body structure 77 provided with a transformed pressure space 78 having a discharge port 79 and a cup valve member 80 having a cup valve portion 81 in covering relation with respect to the port and cooperating with the seat 82 bounding the discharge end of the port to define a discharge orifice. As the transformed fluid pressure space 78 is supplied with liquid from any suitable pressure source through the orifice 83, it will be apparent that the transformed pressure is determined by the discharge area of the orifice defined between the cup valve and its seat.

The cup valve member 80 has a stem 84 which is in thrust-transmitting engagement with the portion 76 of the leaf spring of the governor, the means providing for the thrust-transmitting connection preferably including the abutment plate 85 for the lower end of the load spring 75.

Fluid under transformed pressure is supplied to the pressure chamber 86 to which is exposed the pressure area of the relay 87 controlling communication of admission and exhaust ports 88 for the operating cylinder 89 with the pressure port 90 and with the exhaust ports 91. The lower end of the relay is supported by a spring 92 and a spring 93 is interposed between its upper end and a link of the follow-up mechanism 94, the latter being pivotally connected, at 95, to the rod 96 of the operating piston 97 arranged in the operating cylinder 89. The operating piston rod 96 is connected by means of a lever 98 to the admission valve 14.

With an increase in speed of the turbine, the upward thrust due to centrifugal force will be increased and act against the forces of the load spring 75 and of changing transformed fluid pressure acting on the pressure area provided by the cup valve 81 to restrict the cup valve orifice, this operation continuing until the increased transformed fluid pressure brings about restoration of equilibrium. Increase in transformed fluid pressure results in upward movement of the relay and upward movement of the operating piston 97 to move the valve 14 in a closing direction. On the other hand, with an increase in load and decrease in speed, the contrary operation takes place, the admission valve 14 moving in an opening direction.

The governor so far described would operate with the usual change in regulation from minimum to maximum speed or vice versa. Where the speed range is large and, consequently, the regulation at low speed is very high, the regulation may be reduced by the use of compensating apparatus immediately to be briefly described and which is more fully disclosed in my prior Patent No. 2,224,321, December 10, 1940, and in the patent to Gottlieb aforesaid.

The speed compensator includes a piston area 99 formed on the cup valve member 80 and facing in a direction opposed to that of the pressure area of the cup valve 81, and the piston or pressure area 99 is exposed to a pressure chamber 100 connected by the passage 101 to the transformed pressure space 78. The passage 101 has a needle valve 102 providing a variable orifice 103 therefor and an accumulator 104 communicates with the passage 101 between the orifice and the pressure chamber 100. This arrangement provides for the isochronous condition of operation for the reason that the lagging pressure provided for in the pressure chamber 100 may be brought into equilibrium with the transformed fluid pressure.

A valve 105 is preferably associated with the passage 101 between the orifice 102 and the pressure chamber 100, this valve being adjustable to provide for discharge of liquid so that the extent of speed correction may be varied. With the valve entirely closed, the apparatus would operate isochronously and as more and more liquid is allowed to escape, the extent of speed correction is diminished.

The auxiliary speed control or torque-limiting pressure space 29 is connected, by means of the passage 106, to the pressure chamber 86, the passage having a check valve 107 opening toward the chamber. Also, communication of the transformed pressure space 78 with the pressure chamber 86 occurs through a passage 108 having a check valve 109 opening toward the pressure chamber. With this arrangement of pressure spaces and check valves, it will be apparent that the pressure chamber 86 will communicate with the space having the higher pressure.

Figure 3:
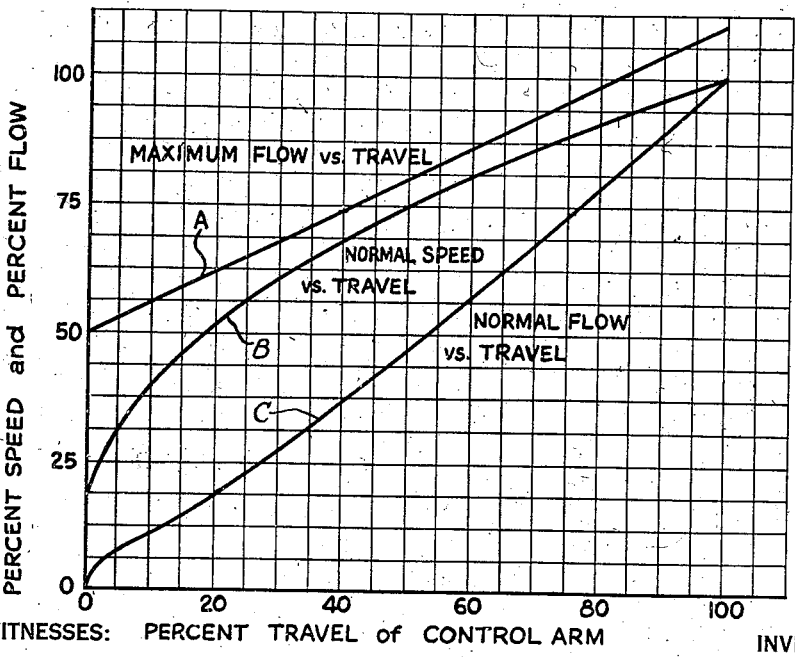
Fig. 3 is a diagram.

In operation, as the speed control lever 15 is moved toward the right to increase the steam flow and speed, it will be apparent that the pressure in the space 29 will be progressively decreased; and, if at any point, the transformed pressure diminishes to a value equal to that in the space 29, then, the latter pressure prevents further reduction in transformed pressure and wider opening of the admission valve 14, the pressure in the space 29 superseding the transformed pressure and limiting the extent to which the admission valve 14 may be opened, that is, it limits the maximum flow of steam and hence the turbine torque. This relation is shown in Fig. 3, wherein the line A represents the maximum flow permitted as determined by the progressive decrease in pressure provided in the space 29. The auxiliary speed control arrangement, therefore, operates to limit opening of the admission valve wide enough to interrupt the synchronously connected relation of the generator and motor.

In Fig. 3, there are shown three curves, the curve A relating maximum flow as restricted by the load limit apparatus to travel (travel of operating piston or admission valve), the curve B relating normal speed to travel, and the curve C relating normal flow to travel. These curves show the characteristic manner in which the interconnected governor and load limit arrangement operates. Assume 40 per cent travel, then the corresponding flow (curve C) would be approximately 37 per cent and the corresponding normal speed (curve B) about 67 per cent. The maximum flow (curve A) would be around 73 per cent, which would correspond to approximately 73 per cent travel on curve C and about 88 per cent speed on curve B. Hence, with the speed-changing lever 15 moved, for example, from the low-speed position to a position corresponding to 40 per cent travel of the operating piston and valve, the latter cannot move, due to operation of the governor in consequence of increase in speed beyond 73 per cent of travel which is fixed by the load limit device. As the speed setting is changed, the load limit device is also changed simultaneously and dependently thereon with the result that, for the full speed range, the load is limited, the limit being varied along curve A, to avoid such torque as would result in pull-out of the synchronous connection.

The auxiliary speed control device is also useful when the ship has a speed less than full speed and is traveling in a rough sea, at which time undesirably large load variations may be occasioned incident to the propeller emerging and submerging, such load variations being effective to interfere with normal boiler operation and particularly with normal operation of the combustion apparatus. Under these conditions, the pressure in the space 29 is varied independently of the speed control lever 15 by means of the lever 16 operatively engaging with the upper end of the load spring 40, whereby, by adjustment of the lever 16, the pressure in the space 29 may be varied over a desired range. Assuming that the pressure in the space 29 is set so that it acts to adjust the admission valve 14 for ⅝ speed, then the governor is set, by operation of the speed changer, to govern at a slightly higher speed. Normally, therefore, the admission to the turbine is controlled by the setting of the lever 16, the governor coming into play as an overspeed device. Thus, the possibility of moving the admission valve over a wide range, as would be the case if only the governor were employed, is avoided, the extent of the narrow valve movement range being fixed by adjustment of the lever 16 and by the governor.

Referring again to the control lever 15, to guard against such rapid movement thereof as to result in a rate of increased turbine torque which is greater than that at which it may be utilized by the propeller motor, there is provided a dashpot, at 110, operatively connected to the lever 15 and operative to impede the rate at which the latter may be moved in a speed-increasing direction. As shown, the dashpot includes a cylinder 111 and a piston 112 connected to the arm 37. A check valve 113 provides for admission of liquid to the cylinder on the suction stroke, whereby the lever 15 may be moved rapidly to the left, or in the speed-decreasing direction. The rate at which the discharge stroke may occur is limited by the needle valve orifice 114.

The present invention is advantageous in coping with any situation where excessive load is likely to result in pull out of the synchronously-connected motor and generator. For example, in making a crash stop, the steam lever 15 is moved to the low-speed position and the controlling lever 17 is moved from its running position, ahead or astern, through the range for induction motor operation in the same direction and the "off" position into the range of induction motor operation in the other direction. Because of the propeller being driven by the water, reversal of the motor may impose such a large load on the latter that, but for the load limit device, the steam valve would be opened so wide and the turbine torque be so high in consequence that difficulty would be experienced in resynchronizing because of pull-out. The load limit arrangement adjustable with the speed changer assures that, for any speed setting, the steam admission valve cannot be opened wide enough to develop torque sufficient to bring about pull-out of the synchronously-connected generator and motor or which would be so great as to interfere with establishment of the synchronous relation in going from induction operation to synchronous operation.

While the invention has been shown in but one form, it will be obvious to those skilled in the art, that it is not so limited, but is susceptible of various changes and modifications without departing from the spirit thereof, and it is desired, therefore, that only such limitations shall be placed thereupon as are specifically set forth in the appended claims.

What is claimed is:

1. In a ship propulsion arrangement of the electric drive type wherein the propeller is operated by an electric motor connected to a generator driven by a turbine and wherein the propulsion speed is varied by varying the speed of the turbine, means for varying the turbine speed to vary the propulsion speed comprising a motive fluid admission valve for the turbine; pressure-responsive means for controlling the admission valve and including a pressure chamber; said pressure-responsive means and admission valve having such relation that decrease in pressure results in movement of the admission valve in an opening direction and vice versa; means providing a first pressure space; means for maintaining liquid under pressure in said first space and including an escape port and a valve cooperating with the latter to control the pressure in the space; means including a first load spring responsive to speed of the turbine for applying force to the valve in a direction to increase the pressure in the first space as the turbine speed increases and vice versa; additional means arranged to adjust the loading of said first load spring so as to vary the force applied to the valve and the pressure in said first space; means providing a second space for liquid under pressure; means providing for the maintenance of liquid under pressure in said second space and including an escape port and a valve cooperating therewith; a second load spring for exerting closing force on the last-named valve; means including a manually controllable element for operating the additional means, means for adjusting the loading of said second load spring and normally operable from said manually controllable element so that, as the latter is moved to increase the loading of the first load spring, the loading of the second load spring is reduced and vice versa; and means responsive to pressures in said first and second spaces for placing said chamber in communication with the space having the higher pressure.

2. In a ship propulsion arrangement of the electric drive type wherein the propeller is operated by an electric motor connected to a generator driven by a turbine and wherein the propulsion speed is varied by varying the speed of the turbine, means for varying the turbine speed to vary the propulsion speed comprising a motive fluid admission valve for the turbine; pressure-responsive means for controlling the admission valve and including a pressure chamber; said pressure-responsive means and admission valve having such relation that decrease in pressure results in movement of the admission valve in an opening direction and vice versa; means providing a first pressure space; means for maintaining liquid under pressure in said first space and including an escape port and a valve cooperating with the latter to control the pressure in the space; means including a first load spring responsive to speed of the turbine for applying force to the valve in a direction to increase the pressure in the first space as the turbine speed increases and vice versa; additional means arranged to adjust the loading of said first load spring so as to vary the force applied to the valve and the pressure in said first space; means providing a second space for liquid under pressure; means providing for the maintenance of liquid under pressure in said second space and including an escape port and a valve cooperating therewith; a second load spring for exerting closing force on the last-named valve; means including a manually controllable element for operating the additional means; means for adjusting the loading of said second load spring and normally controllable from said manually operable element so that, as the latter is moved to operate the additional means for increase in loading of the first load spring, the loading of the second load spring is reduced and vice versa; means providing for operation of the last-named means independently of said manually controllable element; and means responsive to pressures in said first and second spaces for placing said chamber in communication with the space having the higher pressure.

3. In a ship propulsion arrangement of the electric drive type wherein the propeller is operated by a motor connected to a generator driven by a turbine and wherein the propulsion speed is varied by varying the speed of the turbine, means for varying the turbine speed to vary the propulsion speed comprising a motive fluid admission valve for the turbine; pressure-responsive means for controlling the admission valve and including a pressure chamber; said pressure-responsive means and admission valve having such relation that decrease in pressure results in movement of the admission valve in an opening direction and vice versa; means providing a first pressure space; means for maintaining liquid under pressure in said first space and including an escape port and a valve cooperating with the latter to control the pressure in said space; a governor operated by the turbine and acting on the valve so as to exert an increase in closing force thereon upon an increase in speed and vice versa; said governor including flyweights and a first load spring for resisting outward movement of the flyweights under the influence of centrifugal force; means providing a second space for liquid under pressure; means for maintaining liquid under pressure in said second space and including an escape port and a valve cooperating with the latter; a second load spring for applying closing force to the last-named valve; means including a manually operable element for adjusting the loading of the first load spring; means for adjusting the loading of said second load spring and normally operable from said manually operable element so that, as the latter is moved to increase the loading of the first spring, the loading of the second load spring is reduced and vice versa; and means responsive to pressures in said first and second spaces for placing said chamber in communication with the space having the higher pressure.

4. In a ship propulsion arrangement of the electric drive type wherein the propeller is operated by a motor connected to a generator driven by a turbine and wherein the propulsion speed is varied by varying the speed of the turbine, means for varying the turbine speed to vary the propulsion speed comprising a motive fluid admission valve for the turbine; pressure-responsive means for controlling the admission valve and including a pressure chamber; said pressure-responsive means and the admission valve having such relation that decrease in pressure applied to the pressure-responsive means results in movement of the admission valve in an opening direction and vice versa; means providing a first pressure space; means for maintaining liquid under pressure in said first space and including an escape port and a first valve cooperating with the latter to determine the pressure in said space; means including a first load spring responsive to speed of the turbine for applying force to the first valve in a direction to increase the pressure in the first space as the turbine speed increases and vice versa; said first valve having an area exposed to pressure in the first space so that the force of such pressure acting thereon tends to move the valve in a direction to decrease the pressure; a servo-motor for varying the loading of said first load spring and including pressure-responsive controlling means; means providing a second space to which said pressure-responsive controlling means is exposed; means for maintaining liquid under pressure in said second space and including an escape port, a second valve cooperating with the escape port to control the escape of liquid therefrom, said second valve having an area exposed to pressure in the second space so that the force of such pressure is applied thereto in a valve-opening direction, and a second load spring for applying force to the valve in a valve-closing direction; means providing a third space for liquid under pressure; means for maintaining liquid under pressure in the third space and including an escape port, a third valve cooperating with the latter to control escape of liquid therefrom, said third valve having an area exposed to pressure in the third space so that the force of the latter is applied thereto in a valve-opening direction, and a third load spring for applying force to the third valve in a valve-closing direction; means including a control lever for adjusting the loading of the second and third springs in inverse relation; and means responsive to pressures in said first and third spaces for placing said chamber in communication with the space of higher pressure.

5. The combination as claimed in claim 4 with means for limiting the rate at which the lever may move to increase the loading of said second spring.

6. The combination as claimed in claim 4 wherein the first valve has a piston area facing in such a direction that pressure applied thereto tends to move the valve in a closing direction and means providing for the application of fluid under pressure to the piston area including a passage communicating with the first space, means providing an orifice in the passage, and an accumulator communicating with the passage between the orifice and the piston area.

7. The combination as claimed in claim 4 wherein the first valve has a piston area facing in such a direction that pressure acting thereon exerts closing force on the valve and means providing for the application of fluid pressure to the piston area including a passage communicating with the first space, a needle valve providing an adjustable orifice in the passage, an accumulator communicating with the passage between the orifice and the piston area, and an adjustable escape valve also communicating with the passage between the orifice and the piston area.

8. The combination as claimed in claim 4, with manually-operable means for adjusting the third spring independently of said lever.

9. In a ship propulsion arrangement of the electric drive type wherein the propeller is operated by a motor connected to a generator driven by a turbine and wherein the propulsion speed is varied by varying the speed of the turbine, means for varying the turbine speed to vary the propulsion speed comprising a motive fluid admission valve for the turbine, pressure-responsive means for controlling the admission valve, said pressure-responsive means and the admission valve having such relation that a decrease in pressure applied to the pressure-responsive means results in movement of the admission valve in an opening direction and vice versa, means providing a pressure space to which the pressure-responsive means is exposed, means for maintaining liquid under pressure in said space and including an escape port and a valve cooperating with the latter to determine the pressure in said space, means including a load spring responsive to speed of the turbine for applying force to the valve in a direction to increase the space pressure as the turbine speed increases and vice versa, said valve having an area exposed to pressure in the space so that the force of such pressure acting thereon tends to move the valve in a direction to decrease the pressure, means utilizing fluid supplied from said space and operating in a delayed manner for applying to the valve force which counterbalances to a desired extent the force exerted thereon by pressure of fluid in said space, means for varying the loading of the load spring, and means operated by the last-named means for limiting opening of the admission valve such that the permitted extent of opening of the latter increases as the load spring is adjusted for increase in turbine speed and vice versa.

10. In a ship propulsion arrangement of the electric drive type wherein the propeller is operated by a motor connected to a generator driven by a turbine and wherein the propulsion speed is varied by varying the speed of the turbine, means for varying the turbine speed to vary the propulsion speed comprising a motive fluid admission valve for the turbine; pressure-responsive means for controlling the admission valve; said pressure responsive means and the admission valve having such relation that a decrease in pressure applied to the pressure-responsive means results in movement of the admission valve in an opening direction and vice versa; means providing a pressure space to which the pressure-responsive means is exposed; means for maintaining liquid under pressure in said space and including an escape port and a valve cooperating with the later to determine the pressure in said space; means including a load spring responsive to speed of the turbine for applying force to the valve in a direction to increase the space pressure as the turbine speed increases and vice versa; said valve having an area exposed to pressure in the space so that the force of such pressure acting thereon tends to move the valve in a direction to decrease the pressure; means for substantially balancing the force exerted on the valve by fluid under pressure in said space and comprising a piston area formed on said valve, said piston area being substantially equal to and opposed to the area of the valve exposed to pressure in said space, means providing a pressure chamber for the piston area, a passage connecting said pressure space and said pressure chamber, an orifice in said passage, and an accumulator communicating with the passage between the orifice and said pressure chamber; means for varying the loading of the load spring; means operated by the last-named means for limiting opening of the admission valve normally to an extent dependent upon adjustment of such last-named means such that the permitted extent of opening of the admission valve increases as the load spring is adjusted for increase in turbine speed and vice versa; and means for adjusting the limiting means independently of the means for varying the loading of the load spring.

11. In a ship propulsion arrangement of the electric drive type wherein the propeller is operated by a motor connected to a generator driven by a turbine and wherein the propulsion speed is varied by varying the turbine speed, means for varying the propulsion speed comprising a motive fluid admission valve for the turbine, a governor controlling the admission valve and provided with speed-changing means, said speed-changing means being adjustable so as to control the admission valve in a manner to maintain the speed of the turbine constant and at a value corresponding with the adjustment of the speed-changing means as the load on the turbine varies, adjustable means co-acting with the governor for limiting the extent to which the admission valve may be opened by the governor as the load on the turbine varies, and manually-controllable means for simultaneously effecting adjustment of the speed-changing means and of the limiting means so that the extent to which the admission valve may be opened by the governor is increased as the speed-changing means is adjusted for increase in turbine speed and vice versa.

12. In a ship propulsion arrangement of the electric drive type wherein the propeller is operated by a motor connected to a generator driven by a turbine and wherein the propulsion speed is varied by varying the speed of the turbine, means for varying the turbine speed to vary the propulsion speed comprising a motive fluid admission valve for the turbine, a governor controlling the admission valve and provided with speed-changing means, said speed-changing means being adjustable so as to control the admission valve in a manner to maintain the speed of the turbine constant and at a value corresponding with the adjustment of the speed-changing means as the load on the turbine varies, adjustable means coacting with the governor for limiting the extent to which the admission valve may be opened by the governor as the load on the turbine varies manually-controllable means for adjusting the speed changing means and the limiting means simultaneously so as to increase the extent of opening of the admission valve permitted by the limiting means as the speed changing means is adjusted for increase in speed and vice versa, and means providing for adjustment of the limiting means independently of the speed changing means.

ANTHONY F. SCHWENDNER.